US009286581B2

(12) United States Patent
Piersol et al.

(10) Patent No.: US 9,286,581 B2
(45) Date of Patent: Mar. 15, 2016

(54) USER INTERFACE WITH INBOX MODE AND DOCUMENT MODE FOR SINGLE INPUT WORK FLOW ROUTING

(75) Inventors: Kurt W. Piersol, Campbell, CA (US);
Kanae Amemiya, Cupertino, CA (US);
Bradley J. Rhodes, Alameda, CA (US)

(73) Assignee: Ricoh Co., Ltd., Tokyo (JP)

( * ) Notice: Subject to any disclaimer, the term of this patent is extended or adjusted under 35 U.S.C. 154(b) by 378 days.

(21) Appl. No.: 12/826,556

(22) Filed: Jun. 29, 2010

(65) Prior Publication Data
US 2011/0320925 A1 Dec. 29, 2011

(51) Int. Cl.
*G06F 17/30* (2006.01)
*G06Q 10/06* (2012.01)
*G06F 17/24* (2006.01)

(52) U.S. Cl.
CPC .............. *G06Q 10/06* (2013.01); *G06F 17/243* (2013.01)

(58) Field of Classification Search
CPC ............................... G06F 17/30; G06F 17/243
USPC .................................................. 715/231, 255
See application file for complete search history.

(56) References Cited

U.S. PATENT DOCUMENTS

| | | | | |
|---|---|---|---|---|
| 6,067,531 A * | 5/2000 | Hoyt et al. | ....................... | 705/35 |
| 8,018,518 B2 | 9/2011 | Nobels | | |
| 2003/0144982 A1* | 7/2003 | Reulein | ................ | G06F 17/243 |
| 2005/0219263 A1 | 10/2005 | Thompson et al. | | |
| 2006/0114488 A1* | 6/2006 | Motamed | ..................... | 358/1.13 |
| 2006/0212359 A1 | 9/2006 | Hudgeon | | |
| 2006/0218127 A1 | 9/2006 | Tate et al. | | |
| 2006/0253478 A1* | 11/2006 | Graham et al. | ................ | 707/100 |
| 2006/0287950 A1 | 12/2006 | Steinbert et al. | | |
| 2007/0047781 A1 | 3/2007 | Hull et al. | | |
| 2007/0113164 A1 | 5/2007 | Hansen et al. | | |
| 2007/0143663 A1* | 6/2007 | Hansen et al. | ................. | 715/512 |
| 2007/0198560 A1* | 8/2007 | Foygel et al. | ................. | 707/101 |
| 2007/0226374 A1 | 9/2007 | Quarterman et al. | | |

(Continued)

FOREIGN PATENT DOCUMENTS

| | | |
|---|---|---|
| CN | 1310368 A | 8/2001 |
| CN | 101086737 A | 12/2007 |

(Continued)

OTHER PUBLICATIONS

Zadeh, L.A., "Fuzzy Sets", Department of Electrical Engineering and Electronics Research Laboratory, University of California, Berkeley, California, Information and Control 8, pp. 338-353 (1965).

(Continued)

*Primary Examiner* — Mohammed-Ibrahim Zuberi
(74) *Attorney, Agent, or Firm* — Patent Law Works LLP

(57) ABSTRACT

A user interface for a portable computing device provides two modes of operation. In a first mode, an inbox of all documents accessible by the portable computing device are presented. Each of the items in the inbox is selectable, and if selected, the user interface transitions to a second document presentation mode. In the document presentation mode, the user may annotate the document and upon providing a single input (selecting a submit button), the system automatically forwards the document (including the annotations) to the next state in the workflow. If the user transitions back to the inbox mode from the document presentation mode, no action is taken on the document but the strokes are stored with the document on the portable computing device.

20 Claims, 10 Drawing Sheets

(56) References Cited

U.S. PATENT DOCUMENTS

| | | | |
|---|---|---|---|
| 2007/0288835 A1 | 12/2007 | Watanabe | |
| 2008/0030599 A1 | 2/2008 | Stavely et al. | |
| 2008/0040162 A1* | 2/2008 | Brice | 705/3 |
| 2008/0059390 A1 | 3/2008 | Cox et al. | |
| 2008/0129667 A1 | 6/2008 | Zehner et al. | |
| 2008/0218812 A1* | 9/2008 | Wolf | 358/474 |
| 2009/0012887 A1 | 1/2009 | Taub et al. | |
| 2009/0086945 A1 | 4/2009 | Buchanan et al. | |
| 2009/0094275 A1* | 4/2009 | Patton et al. | 707/103 R |
| 2009/0171961 A1* | 7/2009 | Fredrickson | 707/7 |
| 2010/0179816 A1 | 7/2010 | Wu et al. | |
| 2010/0179882 A1 | 7/2010 | Rigole | |
| 2010/0239176 A1 | 9/2010 | Yamakado | |
| 2011/0060910 A1* | 3/2011 | Gormish et al. | 713/176 |
| 2011/0137818 A1 | 6/2011 | Goad et al. | |
| 2011/0145094 A1 | 6/2011 | Dawson et al. | |
| 2011/0231745 A1 | 9/2011 | Levesque et al. | |
| 2011/0311145 A1* | 12/2011 | Bern et al. | 382/195 |
| 2013/0167020 A1* | 6/2013 | Farmer et al. | 715/255 |

FOREIGN PATENT DOCUMENTS

| | | |
|---|---|---|
| CN | 101147130 | 3/2008 |
| CN | 101206564 | 6/2008 |
| CN | 101582083 A | 11/2009 |
| EP | 2 107 480 | 10/2009 |
| EP | 2107480 | 10/2009 |
| JP | 08-335214 | 12/1996 |
| JP | 09-325879 | 12/1997 |
| JP | 2000-69304 | 3/2000 |
| JP | 2000-287164 | 10/2000 |
| JP | 20045700 | 1/2004 |
| JP | 2006-331122 | 12/2006 |
| JP | 2007-257670 | 10/2007 |
| JP | 2007-328489 | 12/2007 |
| JP | 2008-097435 | 4/2008 |
| JP | 2008-524735 | 7/2008 |
| JP | 2008-204469 | 9/2008 |
| JP | 2008537816 | 9/2008 |
| JP | 2009-003596 | 1/2009 |
| JP | 2009-075879 | 4/2009 |
| WO | 2005054933 | 6/2005 |
| WO | WO 2006100194 | 9/2006 |
| WO | WO2009044138 | 4/2009 |
| WO | WO 2009044138 | 4/2009 |

OTHER PUBLICATIONS

Dempster, A.P., "Upper and Lower Probabilities Induced By A Multivalued Mapping", The Annals of Mathematical Statistics, vol. 38, No. 2 (Apr. 1967), pp. 325-339.

Shafer, Glenn, "A Mathematical Theory of Evidence", Princeton University Press, 1976, pp. 1-15.

Anand, Paul, "Foundations of Rational Choice Under Risk", Clarendon Press, Oxford University Press 1993.

Zadeh, L.A., "Fuzzy Sets As A Basis For A Theory of Possibility", Fuzzy Sets and Systems 100 Supplement (1999), Computer Science Division, Department of Electrical Engineering and Computer Science and the Electronics Research Laboratory, University of California, Berkeley, CA 94720, USA, pp. 9-34.

PCT Search Report and Written Opinion, PCT Patent Application No. PCT/JP2011/064600, Jun. 20, 2011, 12 pages.

PCT Search Report and Written Opinion, PCT Patent Application No. PCT/JP2011/065128, Jun. 24, 2011, 10 pages.

PCT Search Report and Written Opinion, PCT Patent Application No. PCT/JP2011/065236, Jun. 27, 2011, 11 pages.

Anand, Paul, "Foundations of Rational Choice Under Risk", Clarendon Press, Oxford University Press 1993, pp. 1-11.

PCT Search Report and Written Opinion, PCT Patent Application No. PCT/JP2011/070675, Dec. 6, 2011, 13 pages.

Wu et al. "User-Preference Based Service Selection Using Fuzzy Logic" (2010) CNSM, pp. 342-345 (http://ieeexplore.ieee.org/stamp/stamp.jsp?arnumber=05691228).

United States Office Action, U.S. Appl. No. 12/826,578, Mar. 28, 2012, 22 pages.

United States Office Action, U.S. Appl. No. 12/879,148, Apr. 19, 2012, 28 pages.

KR Office Action for KR Patent Application No. 10-2012-7033619, dated Dec. 30, 2013, 16 pages.

Extended European Search Report for PCT Application PCT/JP2011065128, dated Jan. 19, 2015, 5 pages.

Chinese Office Action for Chinese Patent Application No. 2011800415413, dated Apr. 23, 2015, 15 pages.

Second Office Action for CN2011800415413 (English Translation) dated Dec. 16, 2015, 8 pages.

* cited by examiner

USER INTERFACE WITH INBOX MODE AND DOCUMENT MODE FOR SINGLE INPUT WORK FLOW ROUTING

BACKGROUND OF THE INVENTION

1. Field of the Invention

The present embodiment of invention relates to portable computing devices and electronic workflows and in particular, user interfaces for portable computing device and the automated workflow of electronic documents between and portable computing device, a network and a server.

2. Description of the Background Art

The use of portable computing devices has become commonplace for many users. In addition to having a conventional desktop computer, many users also have some type of portable computing device. Examples of present-day computing devices include electronic devices for reading such as the Reader from Sony Corp., the Kindle from Amazon, and the Nook from Barnes & Noble. Smaller portable computing devices include a plethora of smart phones including the iPhone from Apple Computer Inc., the Blackberry from Research In Motion and the Pre from Palm just to name a few. There have also been increased sales of notebook laptops and tablet computers offering different levels of processing capability and size.

One particular problem with such prior devices is that they are difficult to operate and configure for the layman or unsophisticated user. For example, these portable computing devices are very similar to desktop computers and have a variety of configuration details such as input device, output device, communication type, available connections, data synchronization which can make them very difficult to use. Furthermore, many of the devices require a conventional keyboard or some pseudo-simulated type version of the keyboard in which to input data to the portable computing devices. This requires that the users learn a number of different interfaces to interact with portable computing devices. Those interfaces may also change depending on the application that is being run by the portable computing device. Requiring the use of such numerous and different interfaces reduces the usability and convenience of such devices.

Another problem with the prior art computing devices is that they are designed so that the user has control over every aspect of the computing experience. It is assumed that the user knows where a document is to be routed, who it should be routed to, what attachments or additional information is necessary, what format the receiver is willing to accept or able to process as well as a variety of other control functions. Again, for the unsophisticated user, this large number of requirements or controls makes the technology unusable or usable only after investing a significant amount of time into learning different parameters and what the setting should be in order to use the devices desired. For example, for the unsophisticated user, the mere act of saving a file before exiting a document or transitioning to another operation or application program often causes the loss of data (and the repetition of data input or other steps) because the act of saving is not performed. Thus there is a need for user interfaces that are simple to use and a way of processing documents that is automatic.

SUMMARY OF THE INVENTION

The present embodiment of invention overcomes the deficiencies and limitations of the prior art by providing a user interface with an inbox mode and a document presentation mode for single button work flow routing. The present embodiment of invention provides a user interface that toggles between an inbox mode and the document presentation mode. In the inbox mode, the user is able to view documents that are editable and select a document for editing. In the document presentation mode, the selected document is displayed on the portable computing device and is editable by the user. The present embodiment of invention advantageously allows editing using only a stylus. This presents a portable computing device that provides a paper-like workflow experience. The present embodiment of invention also includes workflow control processes and devices such that upon selection of the submit button a document and any additions, edits or annotations made to a document are sent to the next step in the workflow without the user having to provide any routing information or do anything other than depressed the submit button. For purposes of the present application, the phrases "annotation," "annotate," "annotating," "annotated," etc. mean the addition of any information, data, metadata, stroke input, comment, note or other information regardless of how small, unless defined specifically otherwise. The process is completely automatic for the end-user.

In one embodiment, the system of the present embodiment of invention includes: a plurality of portable computing devices coupled by a network to a stroke and image workflow server. The stroke and image workflow server may also be coupled to data storage. In one embodiment, the portable computing devices include a display, stroke capture capability and a wireless communication capability. The portable computing devices are adapted to receive documents, add stroke annotations to the received documents, and send the annotated received images. The portable computing devices present the dual-mode user interface as has been described above. The stroke and image workflow server is coupled to the network for communication with the portable computing devices. The stroke and image workflow server includes a logging module, a workflow module, a verification module and a document transmission module. The stroke and image workflow server sends and receives documents from the portable computing devices, maintains a log for verification, and implements a paper-like workflow for processing the documents. In particular, the stroke and image workflow server uses an inbox paradigm in which to transfer documents to and from the portable computing devices. This stroke and image workflow server also implements a paper-like workflow and handles the overhead of processing electronic documents so that it is invisible to the user. In one embodiment, the stroke and image workflow server is coupled to other computers which can perform processing steps in an overall workflow.

The present embodiment of invention also includes a number of novel methods including a method for transferring documents between a portable computing device in a stroke and image workflow server and a method for presenting user interfaces.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
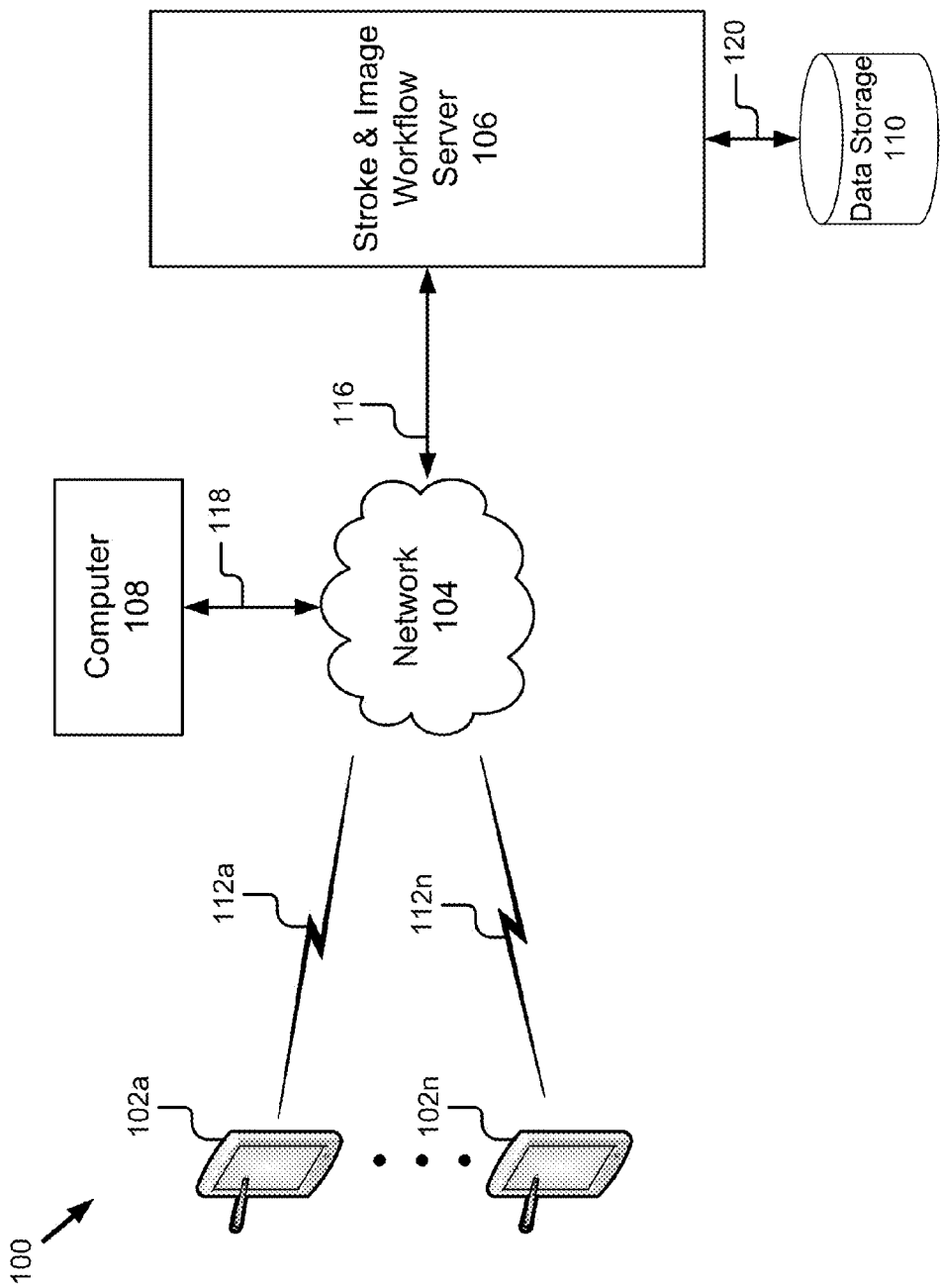
FIG. 1 is a block diagram of an embodiment of a system for stroke and image based workflow in accordance with the present embodiment of invention.

A system for stroke and image based workflow is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present embodiment of invention is described in one embodiment below with reference to portable computing devices that are exemplified in a hardware and software platform like the Amazon Kindle that utilize electronic paper, e-paper or electronic ink display. However, the present embodiment of invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present embodiment of invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of invention is described with reference to a particular programming language. It will be appreciated that a variety of programming languages may be used to implement the teachings of the invention as described herein.

System Overview

FIG. 1 shows an embodiment of a system 100 for automatic stroke and image based workflow. Referring now to FIG. 1, this embodiment of system 100 comprises: a plurality of portable computing devices 102a-102n, a network 104, a computer 108, a stroke and image workflow server 106 and data storage 110.

The plurality of portable computing devices 102a-102n is wirelessly coupled to the network 104 via respective couplings 112a-112n. In one embodiment, the portable computing devices 102a-102n are portable computing devices including a display, stroke capture capability and a wireless communication capability. The portable computing devices 102a-102n are adapted to receive images (e.g., forms or documents), add stroke annotations to the received images, and send the annotated received images. Embodiments of the portable computing devices 102a-102n will be described in more detail below with reference to FIGS. 2 and 3.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The computer 108 is a conventional type such as personal computer or hardware server. The computer 108 is coupled to the network 104 by signal line 118. In one embodiment, the computer can access and communicate with the stroke and image workflow server 106 to initially input a form for processing or verify processing of a particular form according to workflow. For example, a user may use the computer 108 to input to the stroke and image workflow server 106 a document such as a PDF file for further processing. Similarly, the computer 108 may be the recipient of a completed form after all processing according to its workflow has been completed. Computer 108 may communicate with a verification module 430 (See FIG. 4) of the stroke and image workflow server 106 to verify the status or completion of processing of a particular form. Finally, Computer 108 might operate on an electronic document as an intermediate stage of a workflow, or even contain some of the capabilities of the stroke and image workflow server 106, and communicate directly with portable computing devices 102a-102n.

The stroke and image workflow server 106 is coupled to the network 104 via signal line 116 for communication with the portable computing devices 102a-102n. The stroke and image workflow server 106 includes a document transmission module 408, a workflow module 412, a logging module 416, and a verification module 430 (See FIG. 4). The stroke and image workflow server 106 sends and receives documents from the portable computing devices 102a-102n, maintains a log for verification, and implements a paper like workflow and processing the documents. This is particularly advantageous because the stroke and image workflow server 106 implements paper like workflow for the portable device user and handles the overhead of processing electronic documents so that the processing is invisible to the user.

The data storage 110 is coupled to the stroke and image workflow server 106 via signal line 120. In an alternate embodiment, data storage 110 is coupled to the stroke and image workflow server 106 by the network 104. For example, in such an alternate embodiment, the data storage 110 is an online storage Web service such as Amazon S3. The data storage 110 is a non-volatile memory device or similar permanent storage device and media. Data storage device 110 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs.

Although the system of FIG. 1 shows only one stroke and image workflow server 106, it should be understood that there could be any number of additional workflow servers, for example dedicated to other functions, companies, institutions, organizational structures. A computing device 102a-n may communicate with more than one stroke and image workflow server 106. Particular pages or sections of a document could be associated with different workflow servers. Also, portions of a compound document can be forwarded rather than sending the entire compound document.

Portable Computing Device 102

Figure 2A:
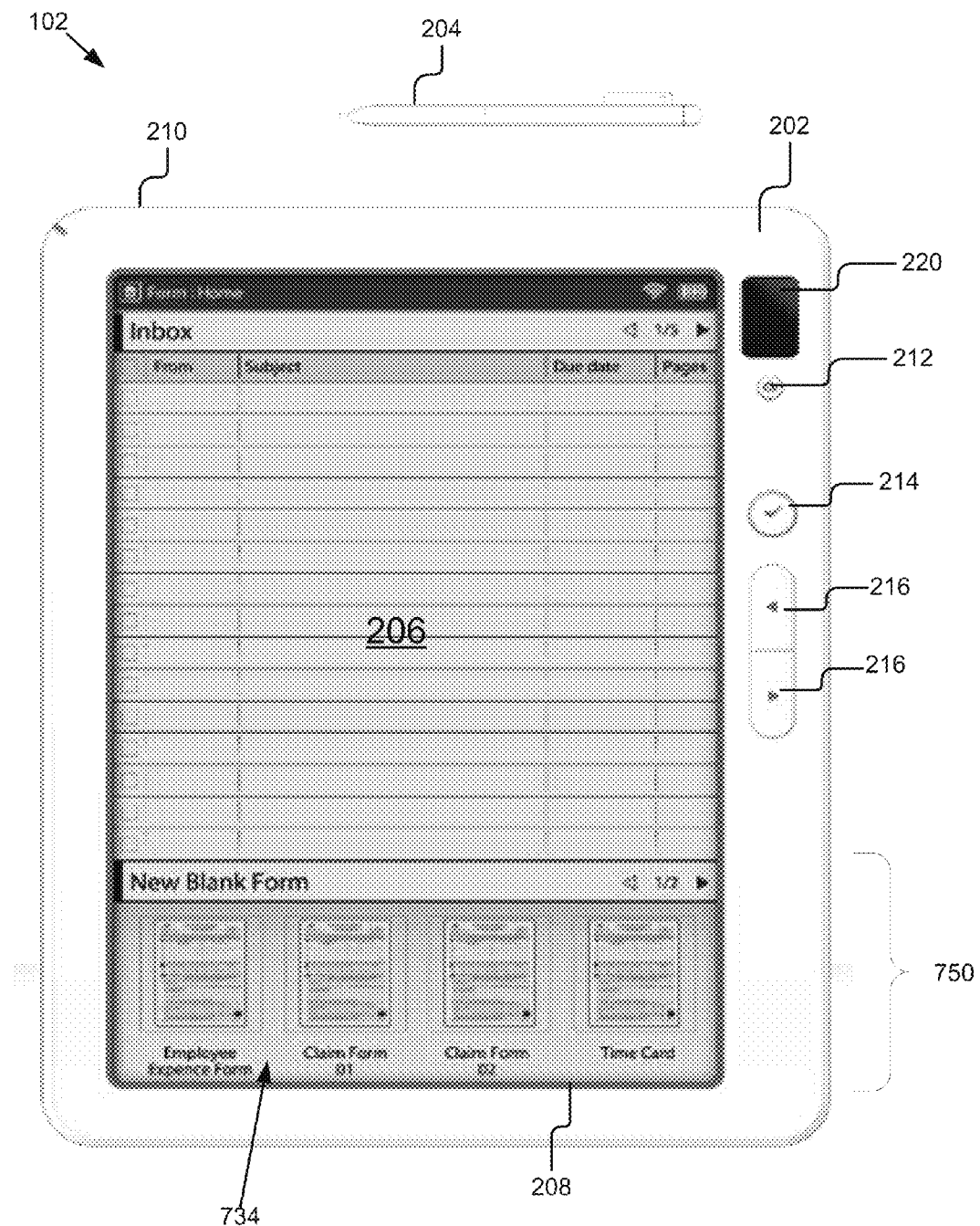
FIG. 2A is a front plan view of an embodiment of a portable computing device in accordance with the present embodiment of invention.
Figure 2B:
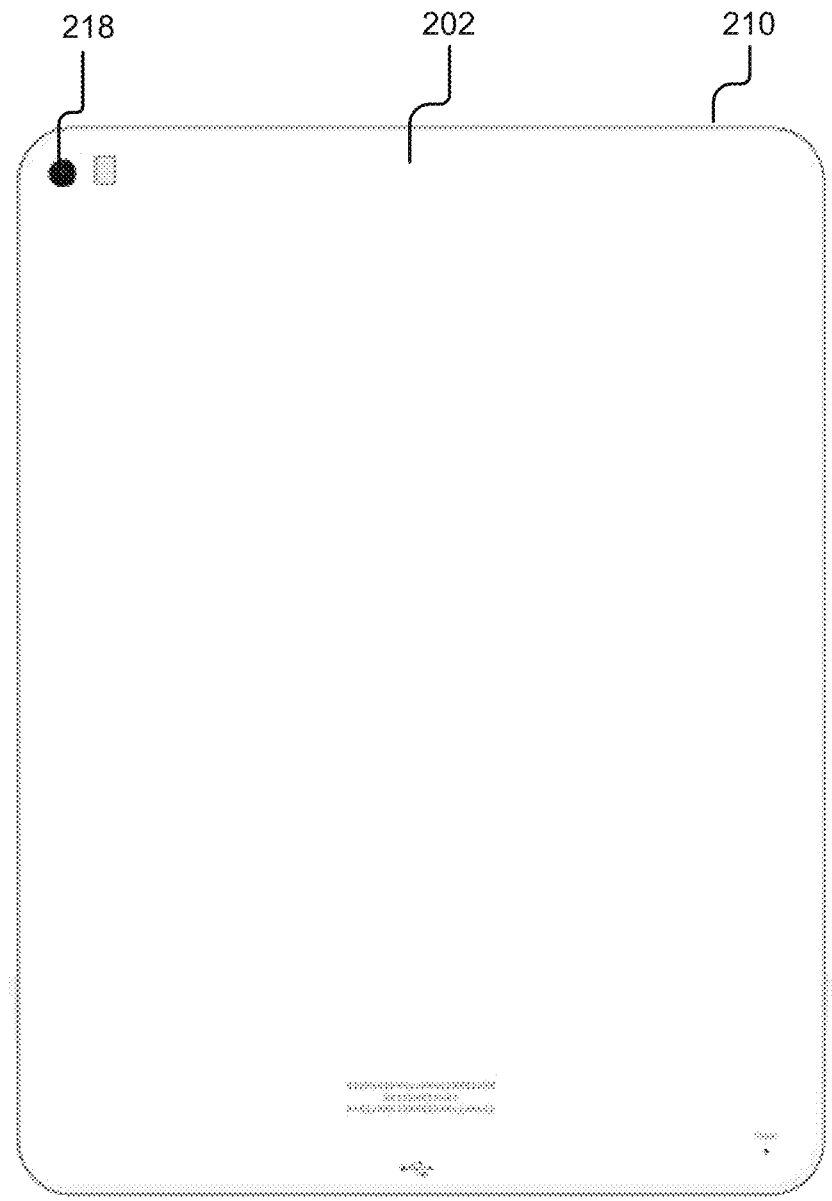
FIG. 2B is a back plan view of the embodiment of a portable computing device of FIG. 2A in accordance with the present embodiment of invention.
Figure 3:
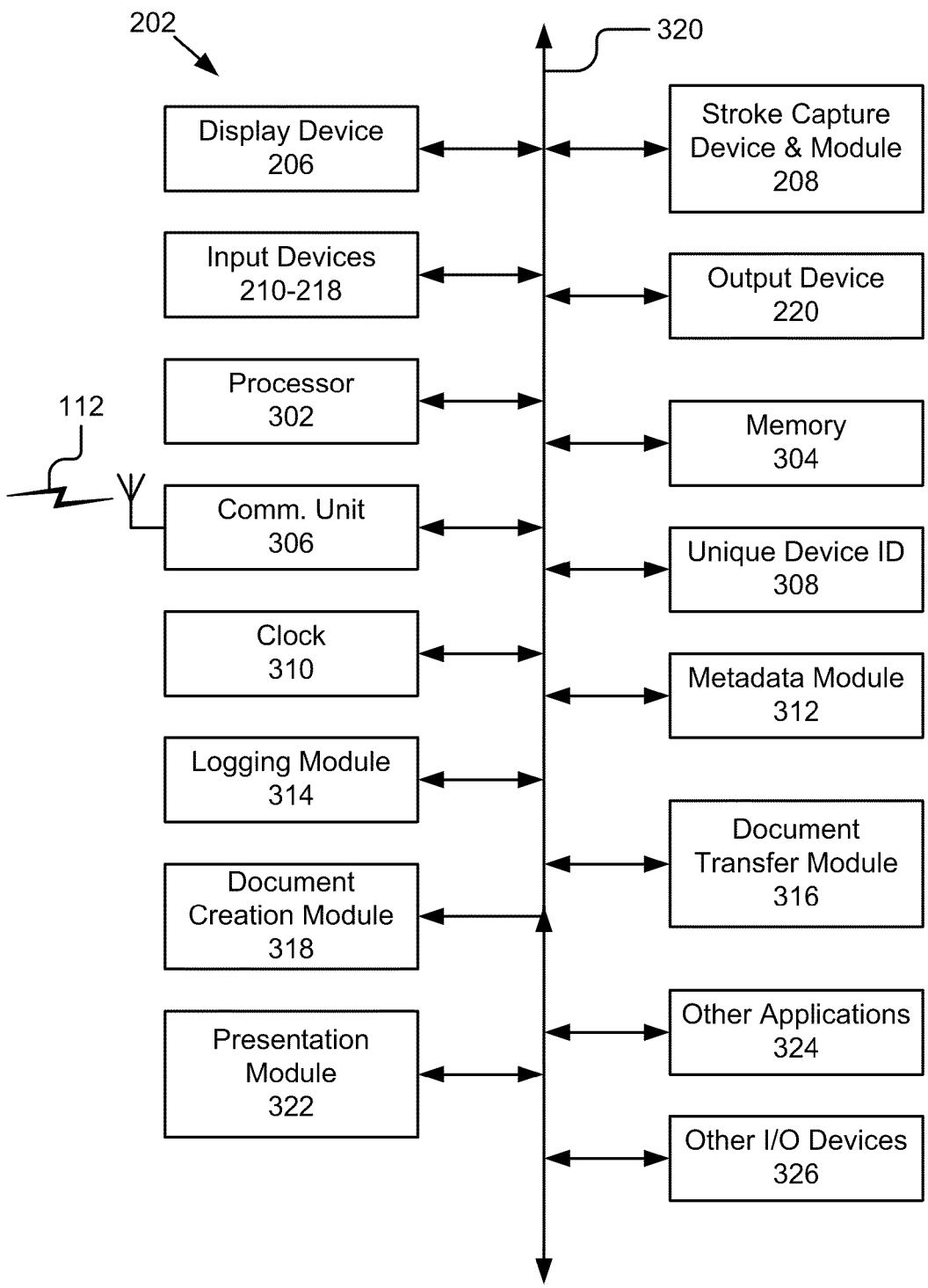
FIG. 3 is a block diagram of the embodiment of the portable computing device in accordance with the present embodiment of invention.

Referring now to FIGS. 2A, 2B and 3, an embodiment of the portable computing device 102 will be described in more detail. The portable computing device 102 comprises a computing pad 202 and a stylus 204. In an alternate embodiment, the portable computing device 102 may include only a computing pad 202 and users can use their finger or other pen-like object as a stylus. The computing pad 202 displays an image and records any strokes written on the image. The strokes are typically displayed immediately on top of the image, just as if written by pen on paper. The strokes are also typically captured as a sequence of points or segments. Usually some timing information is captured with the strokes and sometimes pressure information is captured. "Pen up" and "Pen down" may also be recorded with the strokes, indicating contact with the pad versus proximity to the pad. In some cases, the stylus 204 may have an identifier or a button or different "ends" and this can also be recorded with the strokes. In some cases, pen or stylus 204 velocity and/or pen acceleration are also recorded. In some cases other aspects of the pen or stylus 204 such as pen rotation or the angle of the pen to the display surface are recorded.

The computing pad 202 comprises a display device 206, a stroke capture device and module 208, a plurality of input devices 210-216, a camera 218, an output device 220, a processor 302, a memory 304, a communication unit 306, unique device identifier storage 308, a clock 310, a metadata module 312, a logging module 314, a document transfer module 316, a document creation module 318, a bus 320, a presentation module 322, and other applications 324.

Referring now to FIGS. 2A and 2B, one embodiment for the computing pad 202 is shown. In this embodiment, the display device 206 is an electronic paper display such as manufactured and sold by E-ink. In other embodiments, the display device 206 is a liquid crystal display (LCD) or any other similarly equipped display device, screen, or monitor. The display device 206 represents any device equipped to display electronic images and data as described herein. The display device 206 is sized sufficient to show at least a small 'page' of information. In different embodiments, the display is binary (only two different values for pixels), monochrome (multiple shades of one color), or allows multiple colors and shades. The display device 206 is preferably a light-weight low-power display. In one embodiment, the display device 206 uses reflective light rather than emitting light for use outdoors and uses less power. The display device 206 also has high resolution for displaying information that might otherwise be displayed on paper, but the device display device 206 tolerates update speeds much lower than the 60 Hz refresh rates common with LCD displays.

Aligned with the display device 206, there is a stroke capture device 208 such as a digitizing tablet or graphics pad. The stroke capture device 208 is a contact sensing device or a sonic, electromagnetic or light sensing device with receivers that could be above, below, or around the display. The stroke capture device 208 is capable of accepting strokes from the stylus 204 or a finger or other implement. The stroke capture device 208 is a sensor for the stylus 204 and has resolution sufficient to capture recognizable handwriting and printing and other drawings. In one embodiment, display device 206 is equipped with a touch screen in which a touch sensitive, transparent panel covers the screen of display device 206. In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus 204 ID number or type or indication if a button is pressed on a stylus or the stylus has been inverted, e.g. to erase. Some sensors might return multiple points of contact. Some sensors might be able to distinguish between stylus and finger based touch input. The stroke capture device 208 is either part of or adapted to communicate with the stroke capture module 208.

In addition to the stylus 204, the computing pad 202 provides a plurality of input devices 210-216 to input commands. As shown in FIG. 2A, a first button 210 on the top edge of the computing pad 202 when selected turns the computing pad 202 on and off. In one embodiment, the first button 210 can be selected for a short duration to put the computing pad 20 in sleep mode, and depressed for a longer duration to turn the computing pad 202 off. A second button 212 controls the operation of the camera 218 and when selected causes the camera 218 to capture an image. A third button 214 when selected indicates that annotation of a document is complete and the document should be sent by the computing pad 202. A fourth pair of input buttons 216 allows the user to transition to a next page or previous page, respectively, of a document. Those skilled the art will recognize that these input devices as buttons are merely one embodiment for the plurality of input devices 210-216 and that various other configurations of fewer or more buttons or input devices are within the spirit and scope of the present embodiment of invention. More specifically, in another embodiment, the computing pad 202 has very few (or no) buttons because buttons may interfere with the device being perceived as paper-like.

In such an embodiment, strokes and other metadata will be continuously transmitted as long as there is network connectivity. The completion of a page or set of pages might be indicated by pressing a 'submit' or 'reject' button on the pad, or there may be regions on the displayed page and adding strokes to those regions may cause submission of the appropriate data. Those skilled in the art will recognize that are a variety of different number and configurations for the plurality of input devices 210-216. For example, another configuration includes 1 button for power and one button for submit; a second example has a slider to choose a page among a large number of pages depending on the position of the finger and one or more buttons.

Referring now also to FIG. 2B, the back side of the computing pad 202 is shown. The computing pad 202 includes a camera 218 and an output device 220. As shown in FIG. 2B, the camera 218 is positioned with its lens facing outward on the back side of the computing pad 202 in the upper left-hand corner. The camera 218 is a conventional type such as those available on cell phones or notebook computers. The output device 220 is a device for displaying small images and is used as the camera's viewfinder. In one embodiment, the output device 220 is an organic light emitting diode (OLED) and is only operational when the camera is operational. In another embodiment, the output device 220 is used to indicate the status of the device such as: 1) whether the computing pad 202 has power and is operational; 2) whether the computing pad 202 has network connectivity; 3) whether the computing pad 202 is sending or receiving a compound document; etc. Those skilled in the art will recognize that there may be a variety of additional status indicators beyond those listed above that may be part of the output device 220, or that status might be provided through the main display 206.

Referring now to FIG. 3, the remaining components of the computing pad 202 are described.

The processor 302 comprises an arithmetic logic unit, a microprocessor, a general purpose controller or some other processor array to perform computations, provide electronic display signals to display device 206, and detect and process stroke inputs. The processor 302 is coupled to the bus 320 for communication with the other components of the computing pad 202. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing pad 202 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing pad 202 also includes an operating system executable by the processor such as but not limited to WINDOWS®, MacOS X, Android, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 320 for communication with the other components of the computing pad 202.

The communication unit 306 is coupled to an antenna and the bus 320. An alternate embodiment, the communication unit 306 may provide a port for direct physical connection to the network 104. The communication unit 306 includes a transceiver for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 104 for distribution of files (media objects) using standard network protocols such as TCP/IP, HTTP, HTTPS and SMTP as will be understood to those skilled in the art.

The computing pad 202 includes storage for a unique device identifier 308. The computing pad 202 is coupled to the bus 320 to provide the unique identifier to other components as needed. In one embodiment, the storage is read only memory for storing the unique device identifier 308. In another embodiment, the unique identifier storage 308 is a nonvolatile storage storing a public key-private key pair. In another embodiment, the public key-private key pair is stored within a specialized trusted computing memory integrated with the CPU or main board of the device. It is useful for the computing pad 202 to have a unique identifier that is used to indicate where strokes were recorded or for various communication protocols. In one embodiment, the unique identifier is the hardware MAC address of a network chip in the computing pad 202. The unique identifier 308 may be an internal part of another functional block, such as the communication unit 306, or in nonvolatile storage in memory unit 304. In another embodiment, the unique identifier is a unique ID associated with a memory card on the computing pad 202, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing pad 202 is manufactured with or configured with a private key and the public key disseminated. Then the computing pad 202 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing pad 202.

The clock 310 is a conventional type and provides an indication of local time for the computing pad 202. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software including routines for extracting metadata from a document and storing metadata as part of a document. In one embodiment, the metadata module 312 is instructions executable by the processor 302 to provide the functionality described below with reference to FIGS. 5-9 for accessing both image/page metadata as well as document metadata. In another embodiment, the metadata module 312 soft routines for presenting the user interfaces, capturing stroke information, and routing (sending documents from and receiving at the portable computing device 102) documents according to the workflow. In one embodiment, the metadata module 312 is stored in the memory 304 and is accessible and executable by the processor 302. In any event, the metadata module 312 is adapted for cooperation and communication with the processor 302 and other components of the computing pad 202.

The logging module 314 is software including routines for creating and storing local logs in the memory 304, and more particularly, in a nonvolatile storage portion of the memory 304. In one embodiment, the logging module 314 is a set of routines executable by the processor 302 to store metadata in an entangled log at the computing pad 202 and the stroke and image workflow server 106. The logging module 314 is particularly critical to provide verification of workflow completion in transactions. In one embodiment, the logging module 314 also includes routines for publishing or storing in a publicly available location on the network the logs of its particular computing pad 202. The logging module 314 is coupled by the bus 320 to the processor 302, the memory 304, and the communication unit 306.

The document transfer module 316 is software and routines for transmitting and receiving documents from the stroke and image workflow server 106. In other embodiments, the document transfer module 316 sends and receives documents as formatted messages from any other computing device such as but not limited to the computer 108, the stroke and image workflow server 106 or other portable computing devices 102. The document transfer module 316 is coupled by the bus 320 for communication with the processor 302 and the communication unit 306. The document transfer module 316 is responsible for transmitting and receiving the document or formatted message from the computing pad 202 such as by email, file transfer, XMPP or special purpose application.

In a first embodiment, the document transfer module 316 is client software operational on the computing pad 202 that maintains a directory structure that serves as an inbox. The document transfer module 316 moves documents from a corresponding inbox on the stroke and image workflow server 106 to this directory. Once a document in the inbox of the computing pad 202 has been annotated and the user inputs the submit instruction, the document transfer module 316 removes the document from the directory structure and transfers it to the stroke and image workflow server 106 for further processing.

In a second embodiment, the document transfer module 316 is an e-mail client that is capable of receiving and sending e-mails having attachments. The e-mail client is operable on the processor 302. Mail servers commonly use either the POP or IMAP protocols to talk to mail clients, and the computing pad 202 is configured to use either. The messages are in a format the computing pad 202 can directly use, e.g. an attachment of image files. The messages are in a format that requires conversion on the computing pad 202, e.g. a pdf document. Alternatively, a special mail server could provide conversion of messages so that the pad does not need to support multiple formats. In the case of multiple devices being used in a workflow to distribute work that must only be done once e.g. as in the departmental in-box described above, using IMAP is advantageous. Multiple devices 102a-n may be configured as clients with the same IMAP server and 'username.' The group of devices 102a-n might display all forms in the "inbox." Once any user on any device 102a-n marks the form as 'processed' the device moves the message out of the 'inbox' and perhaps into a 'processed' box on the IMAP server. When the other devices 102a-n check the 'inbox' on the IMAP server, they will determine that the pages are no longer present and will no longer display them. When a pad needs to send a page or strokes or multiple pages and strokes, the pad can act as an email client and send mail, perhaps with the pages in a directory structure that has been compressed and combined into a single file.

In a third embodiment, the document transfer module 316 is a routine for performing file transfer. Various file transfer methods can be used to move documents on and off the computing pad 202. The computing pad 202 could run an ftp, http, or webdav server and other devices could push or pull documents on the computing pad 202. The computing pad 202 could also be configured to get or post new documents to an external server, again via ftp, http, rsync, webdav, or another protocol.

In a fourth embodiment, the document transfer module 316 is a client communication program such as for communicating via MMS or on other communications protocols. XMPP, a protocol used in instant messaging, is used to provide document and stroke communication with a pad. Instant messaging protocols are useful because any member of the messaging group can initiate a message, even while another member is transmitting a message. For the computing pads 202 this allows a service to transmit an image for the pad at the same time as strokes are being transmitted from the pad to server. Instant messaging protocols can also be useful if a group of computing pads 202 is sharing a display space and thus all members of the group may be informed of new strokes.

In a fifth embodiment, the document transfer module 316 is a custom application. Of course, information may be transferred to the computing pad 202 with special purpose applications designed to work with the pad using a pad specific API. An instructor might want to "drag and drop" a worksheet onto a graphical representation of a pad without knowing the specific method used to move the file. In one example embodiment, the document transfer module 316 is rsync. Rsync is a data transfer software application for Unix that synchronizes files and directories from one location to another while minimizing data transfer using delta encoding when appropriate. In the embodiments noted above, the document transfer module 316 might be implemented a store and forward system which opportunistically transmits the documents only when network connectivity is available.

The document creation module 318 is software or routines for creating new documents. The document creation module 318 is operable on the processor 302 and is coupled to the bus 320 for communicating with the other components of the computing pad 202. The document creation module 318 is responsive to signals from the input devices 210-218 or the stroke capture device 208. The document creation module 318 stores template forms of documents in the memory 304. In response to user input, the document creation module 318 accesses the stored template forms and copies the selected one to create a new document from the template form. Once created, the document stored in memory 304, is added to the inbox list maintained by the presentation module 322, and is otherwise editable, manipulatable and transmittable just like any other document.

The bus 320 represents a shared bus for communicating information and data throughout the computing pad 202. The bus 320 may represent one or more buses including an industry standard architecture (ISA) bus, a peripheral component interconnect (PCI) bus, a universal serial bus (USB), or some other bus known in the art to provide similar functionality. Additional components coupled to processor 302 through system bus 320 include the display device 206, the stroke capture device and module 208, the plurality of input devices 210-216, the output device 220, the processor 302, the memory 304, the communication unit 306, the unique device identifier storage 308, the clock 310, the metadata module 312, the logging module 314, the document transfer module 316, the presentation module 322 and the other applications 324. There may also be a plurality of busses in computing system 202, designed to provide the most efficient communications between functional elements.

The presentation module 322 is software and routines for displaying documents and the inbox on the display device 206, and adjusting the display of the image responsive to input from input devices 210-216. The presentation module 322 performs routines that cause the dual mode user interface described below with reference to FIGS. 5-9 to be displayed. In one embodiment, the presentation module 322 is a thin client routine executable by the processor 302 to cause display of the image on the display device 206. The presentation module 322 is coupled by the bus 320 to the display device 206, the processor 302, and the memory 304.

The other applications 324 include other software and routines executable by the processor 302 for various other types of functionality. In one embodiment, one or more application programs are executed by the processor 302 including, without limitation, word processing applications, electronic mail applications, financial applications, and web browser applications.

Finally, the computing pad 202 may include one or more other I/O devices 326. For example, the other I/O devices 326 may include speakers to produce sound, microphones to record sound, a scanner or camera to record documents or images, and other sensors or feedback devices like accelerometers, pager motors, or haptic feedback. Optionally, the other I/O devices 326 may include one or more analog-to-digital or digital-to-analog converters, and/or one or more digital signal processors to facilitate audio processing. These other I/O devices 326 are coupled by bus 320 for communication with the processor 302 and the memory 304. Optionally, a microcontroller may be added as part of other I/O Devices 326 to facilitate power systems control, as well as off-load the main processor 302 from lower-speed lesser-important tasks.

Stroke and Image Workflow Server 106

Figure 4:
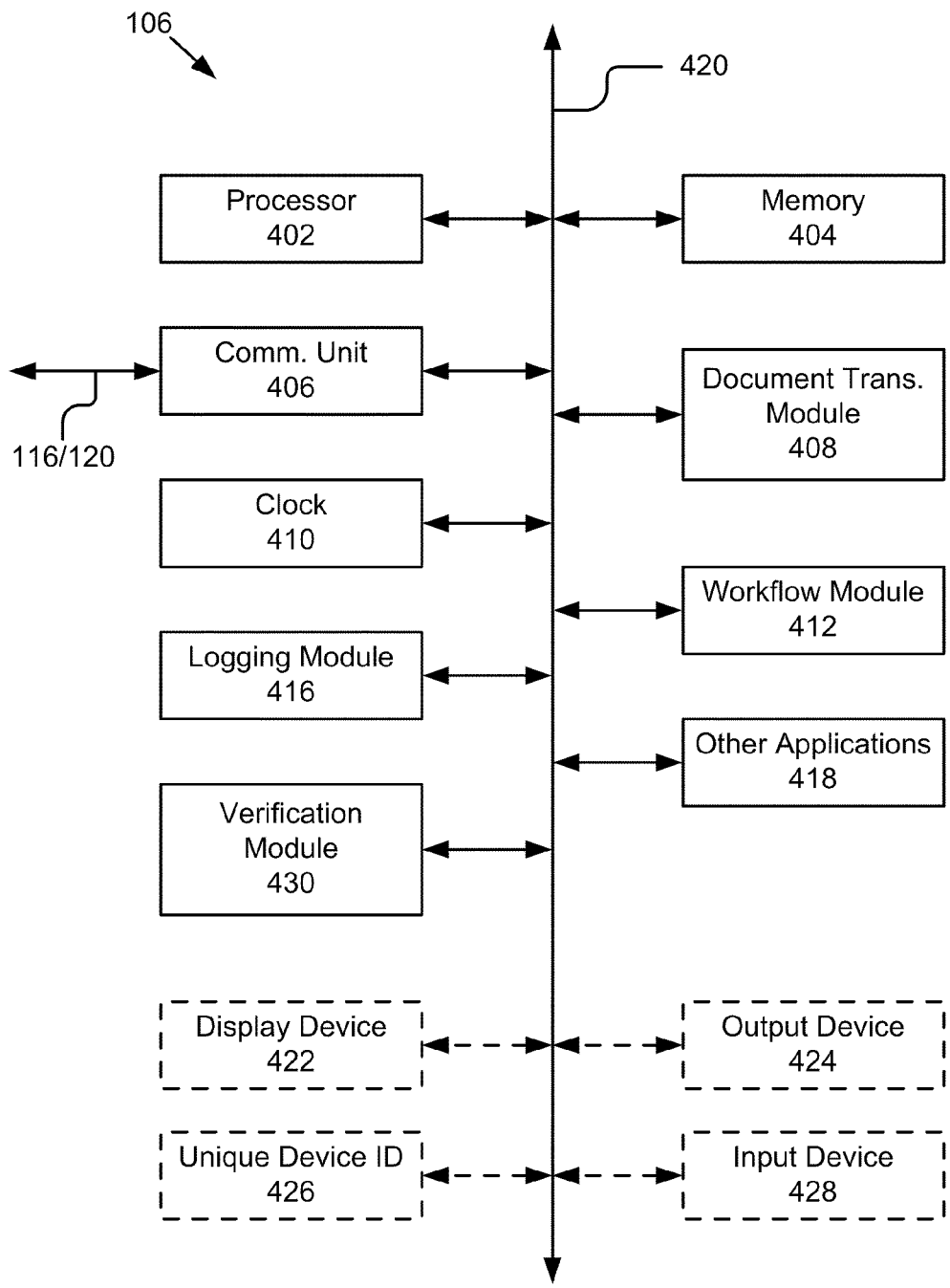
FIG. 4 is a block diagram of an embodiment of the stroke and image workflow server in accordance with the present embodiment of invention.

Referring now to FIG. 4, an embodiment of a stroke and image workflow server 106 will be described in more detail. The stroke and image workflow server 106 comprises a processor 402, a memory 404, a communication unit 406, a document transfer module 408, a clock 410, a workflow module 412, a logging module 416, other applications 418, a bus 420 and a verification module 430. In an alternate embodiment, the stroke and image workflow server 106 further comprises a display device 422, an output device 424, a unique device ID storage 426 and an input device 428.

Those skilled in the art will recognize that some of the components of the stroke and image workflow server 106 have the same or similar functionality to the components of the computing pad 202 so descriptions of these components will not be repeated here. For example, the processor 402, the memory, 404, the communication unit 406, the document transfer module 408, the logging module 416, the clock 410, the other applications 418, display device 422, output device 424, unique device ID 426 and input device 428 have a similar functionality to the processor 302, the memory 304, the communication unit 306, the document transfer module 316, the logging module 314, the clock 310, the other applications 324, display devices 206, output device 220, unique device ID 308, input devices 210-216 of FIG. 3, respectively. Some differences between the components of the stroke and image workflow server 106 and the computing pad 202 are noted below. For example, the communication unit 406 may couple the stroke and image workflow server 106 to the network 104 in a wired manner instead of wirelessly. The processor 402 is more computationally powerful than the processor 302 as the workflow server 106 likely services numerous portable computing devices 102. The document transfer module 408 is an e-mail server as opposed to an e-mail client. The display device 422 may be a CRT, and the output device 424 is speakers. The input device 428 includes a keyboard and mouse type controller. Those skilled in the art will recognize that there may be a variety of other differences as the components of the stroke and image workflow server 106 acts as a hardware server as opposed to a remote client.

The verification module 430 of the stroke and image workflow server 106 is software and routines for verifying the processing of a document. In one embodiment, the verification module 430 is routines executable by the processor 402 to perform verification of document processing as described below. The verification module 430 is coupled by bus 420 to the processor 402, the memory 404 and the communication unit 406. Note that the verification module 430 might be used independently of the stroke and image workflow server 106. In fact, it might run on the computer 108 for independent verification of documents without need to trust a particular server.

The workflow module 412 of the stroke and image workflow server 106 is software and routines for processing and routing documents or formatted messages. The workflow module 412 creates documents 400 or creates formatted messages. The workflow module 412 also works with the logging module 416 to create a system log (stored in the logging module 416, the memory 404 or the data storage 110) and publishes or makes available that log as needed. The workflow module 412 is also responsible for routing the document or formatted messages on to the next location as part of a processing workflow. In one embodiment, the computing pad 202 returns documents by submitting them or sends reply emails including attachments to the stroke and image workflow server 106, and the workflow module 412 determines the routing and next workflow step. It should be noted that the process of creating a system log by the workflow module 412 can create a entangled log, and that the presences of multiple workflow modules 412 servicing distinct pages of the document greatly increases the difficulty of tampering with the document without being detected. For example, a workflow server 106 might create a notepad document which will be transmitted to all meeting members after the end of a meeting. The notepad document would be created with a "next destination" URL containing a group email address. The workflow server 106 would route the document to each member of the group once the notepad is submitted back to the workflow server 106 by the tablet.

For convenience and ease of understanding, the forwarding of documents and the processing of documents within the workflow is described below as being performed by the workflow module 412 of the stroke and image workflow server 106; however, those skilled in the art will recognize that alternatively the same operations may be performed by the computing pad 202. Alternatively, those skilled in the art will recognize that the document routing process and workflow rules might be implemented by separate servers, instead of being implemented as one integrated server.

Those skilled in the art will recognize that there are a variety of ways that the workflow module 412 of the stroke and image workflow server 106 determines what to do with the document once it has been received from the computing pad 202 (submitted by the computing pad 202). In one embodiment, computing pads 202 are configured to work with a particular stroke and image workflow server 106 and submit a page to the stroke and image workflow server 106; for that page, the stroke and image workflow server 106 then determines the next step based on preprogrammed rules. In one embodiment, the stroke and image workflow server 106 determines how to process the document based upon on metadata stored inside the document itself. The metadata may specify additional processing of the document, how the document is to be routed, and to what other computing devices it is to be routed. For example, an ordered series of email addresses stored as metadata is one example of a workflow where the document will be passed to each successive email address. The metadata may also be provided on an entire document basis or a page basis.

In another embodiment, workflows are specified in the document or in the email (formatted message) in which the document was sent. In the simple case of receiving a document by email, the computing pad 202 returns the completed document to the stroke and image workflow server 106. The stroke and image workflow server 106 then extracts the metadata from the completed document, determines the next step in the workflow, and then sends the completed document to the device (e.g., computer 108) identified to perform the next step in the workflow. In an alternate embodiment, the computing pad 202 returns the completed document by e-mail to the stroke and image workflow server 106, and the e-mail includes the workflow. The stroke and image workflow server 106 determines the next e-mail address in which to send the completed document from the e-mail that included the completed document. In an alternate embodiment, HTTP headers could be used instead of or in addition to e-mail headers. If the documents are being transported in a manner that supports page images, strokes, and metadata, then the metadata can contain the workflow instructions and status. Again, in the simple case, the metadata includes a list of email address and the current step of the workflow.

Methods

Figure 5:
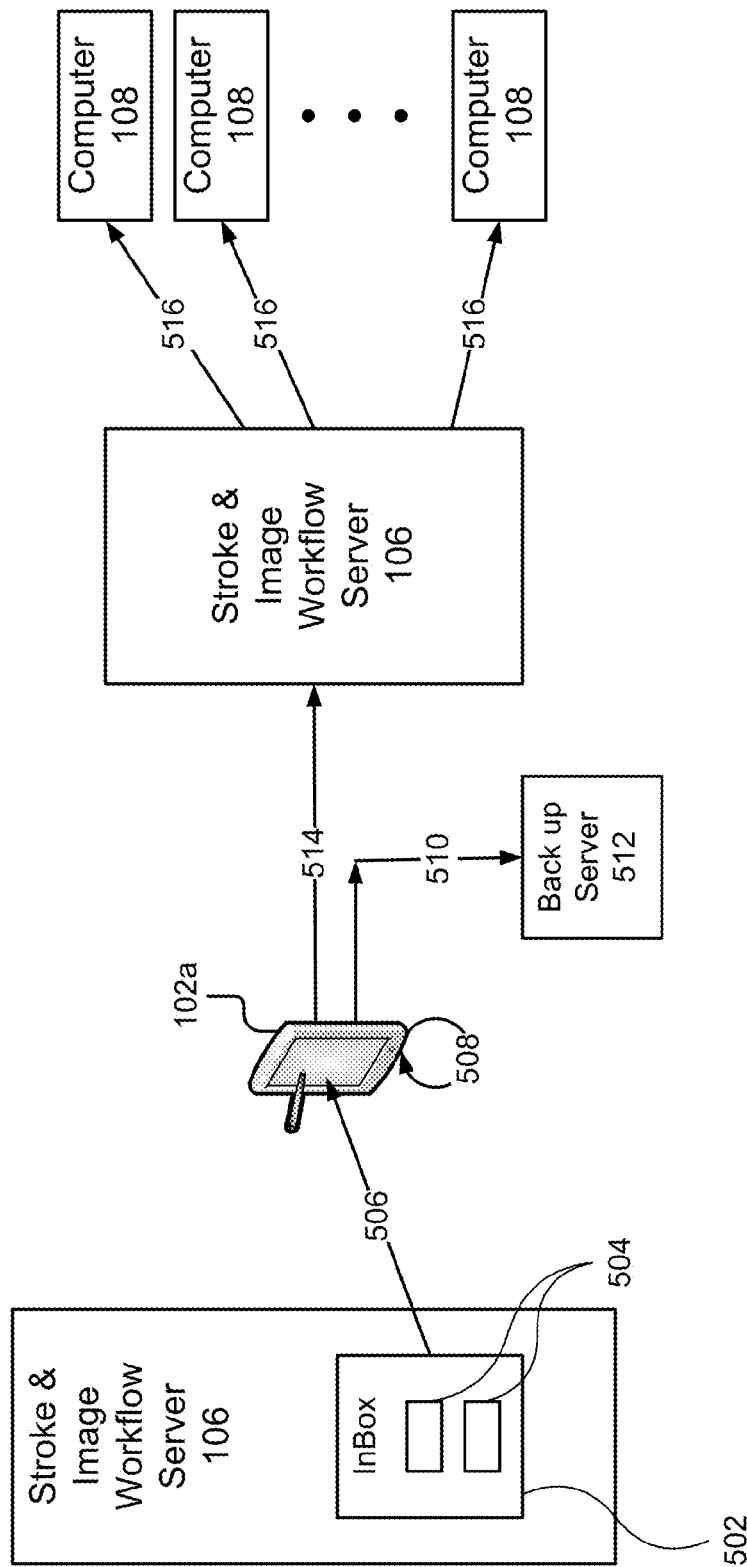
FIG. 5 is a schematic flow diagram illustrating the automatic document processing in accordance with the present embodiment of invention.
Figure 6:
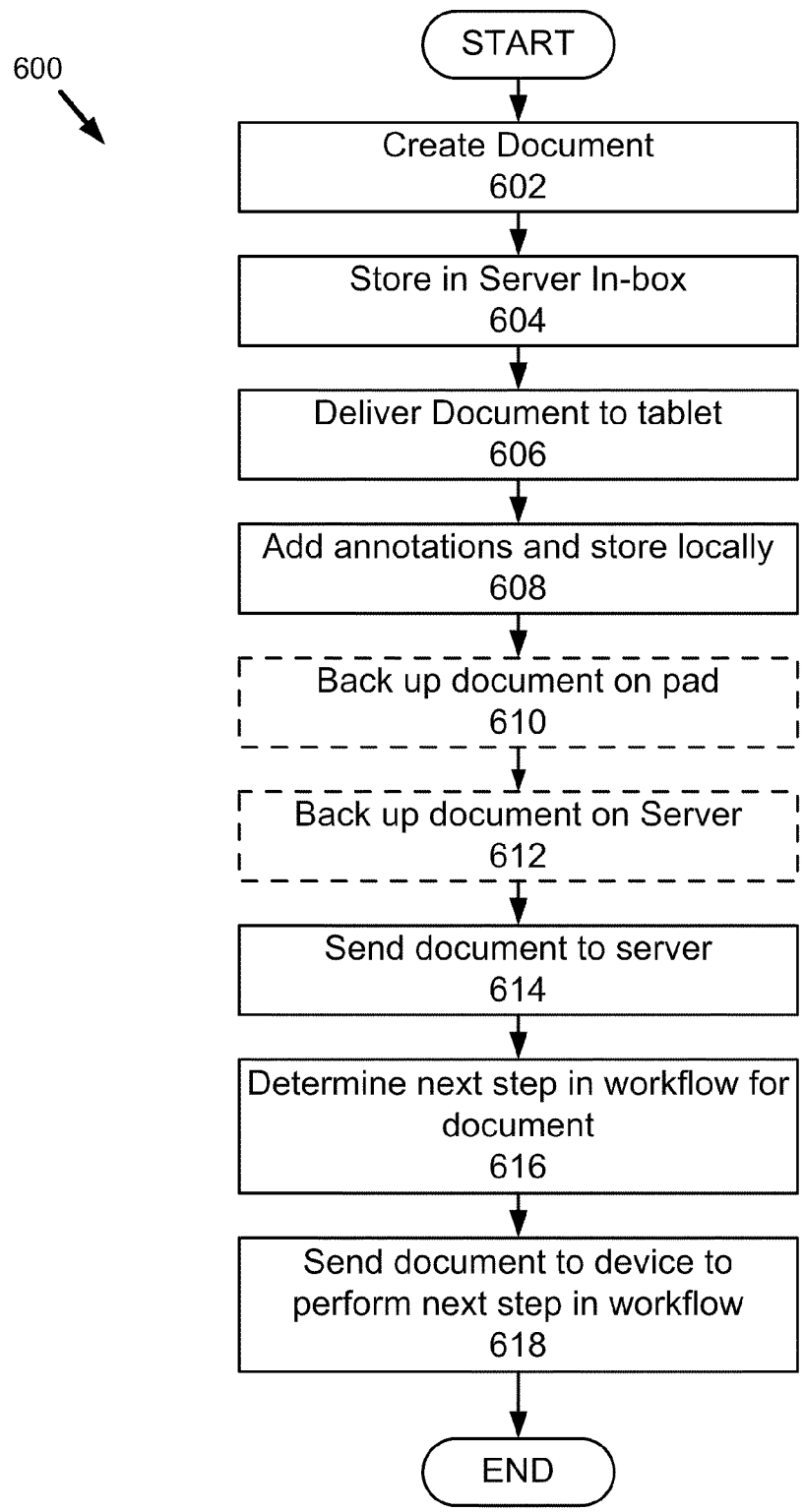
FIG. 6 is a flow chart illustrating a method for automatic document processing in accordance with the present embodiment of invention.
Figure 7:
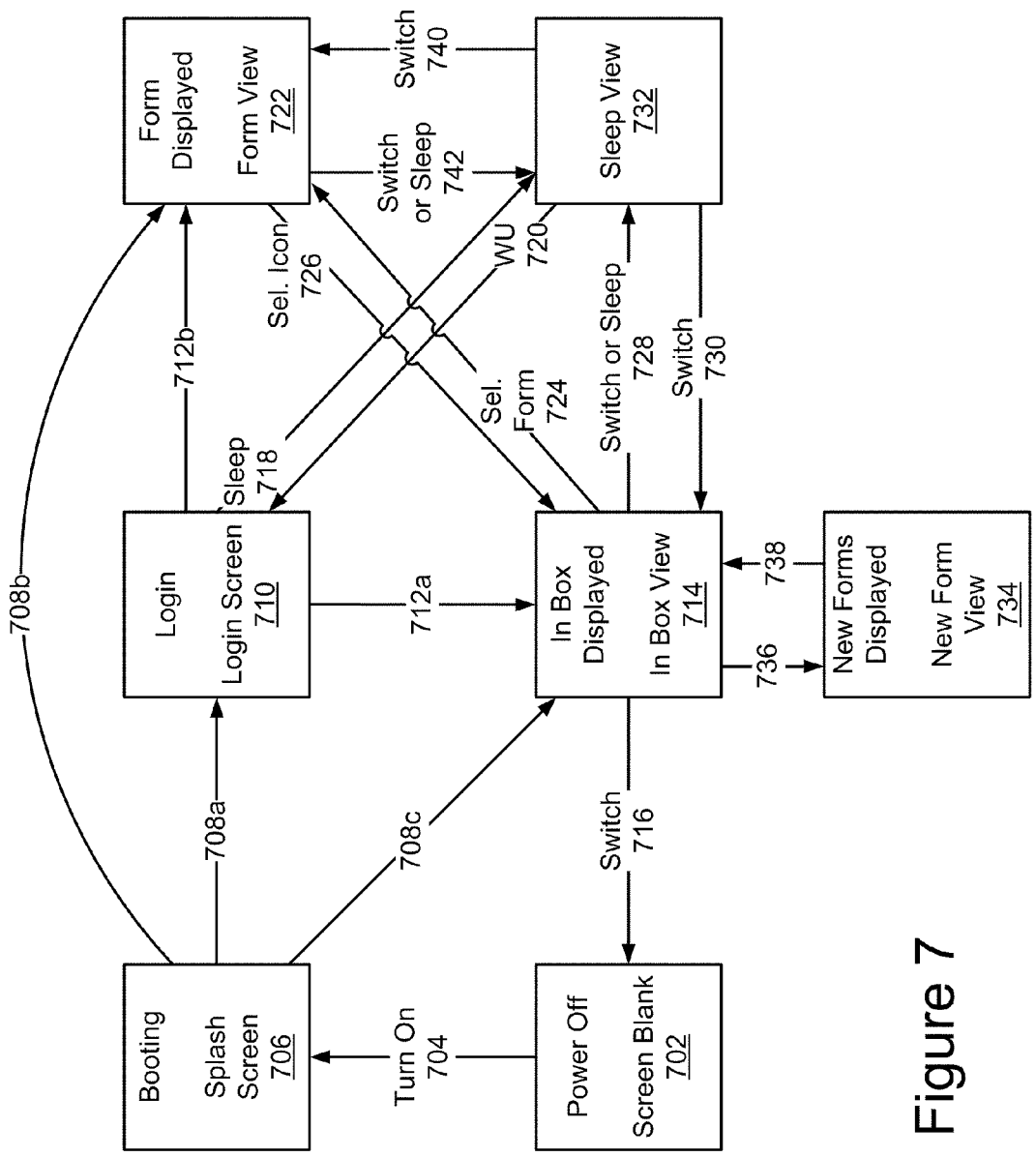
FIG. 7 a flow diagram of the dual mode operation and transitions between of the user interfaces of the present embodiment of invention.

Referring now to FIGS. 5-7, the methods of the present embodiment of invention will be described in more detail.

FIG. 5 shows one embodiment of an automatic document processing method in accordance with the present embodiment of invention. The process begins with the stroke and image workflow server 106 creating and establishing an inbox 502 associated with a portable computing device 102a. The stroke and image workflow server 106 then creates and places one or more documents 504 in the inbox 502 that are scheduled for delivery to the portable computing device 102a. For example, the documents may be forms that the user of the portable computing device 102a needs to complete and return such as a medical information form. The stroke and image workflow server 106 automatically transfers 506 the documents 504 from the inbox 502 to a corresponding inbox (not shown) on the portable computing device 102a. Depending on the embodiment, the transfer of documents may occur at a number of different times: 1) once the documents 504 are placed in the inbox 502; 2) once the portable computing device 102a is coupled for communication with the stroke and image workflow server 106; 3) at periodic times, such as 15 minute intervals; or 4) various combinations of the above. Once the documents 504 have been transferred 506 to the portable computing device 102a, the portable computing device 102a is used to annotate the documents 504 and add strokes and other information to them. The annotations are added to the document 504 and the document 504 is stored back on the portable computing device 102a as depicted by line 508. In one embodiment, the information and the annotations added to documents 504 are backed up 510 off of the portable computing device 102a to a backup server 512. This transfer of documents can occur at times similar to those described above. Those skilled in the art will recognize that this step of backing up annotations made with the portable computing device 102a may be performed at regular intervals such as every 10 minutes or longer to preserve power of the portable computing device 102a. In yet another embodiment, the backup interval can be set by the user. Once the user has completed adding annotations to a particular document 504 and the document 504 is ready for submission, the user inputs a submit instruction and the annotated document 504 is transferred 514 from the portable computing device 102a to the stroke and image workflow server 106. Once the annotated document 504 is received at the stroke and image workflow server 106, it is stored, logged and the next step in the workflow process is determined. Based on the determination of where the document 504 should be sent to next, the stroke and image workflow server 106 transmits 516 the document to the determined device (e.g., the other computers 108). While FIG. 5 illustrates the plurality of computers as being computer 108, those skilled in the art will recognize that computer 108 represents a variety of different vendors capable of performing additional processing or annotation to the document 504.

Referring now to FIG. 6, another embodiment of the method for automatic document processing in accordance with the present embodiment of invention is shown. The method begins by creating 602 a document at the stroke and image workflow server 106. The document created is then stored 604 in an inbox at the stroke and image workflow server 106. In one embodiment, this is performed by storing documents in a predefined directory of the non-volatile storage of the stroke and image workflow server 106. This step may also include generating a rolling hash of the document and logging it at the stroke and image workflow server 106. Next, the document is delivered 606 from the stroke and image workflow server 106 to the computing pad 202. For example, the document can be delivered to the computing pad 202 via Bluetooth radio, Wi-Fi radio, cell communication or any other type of wireless transmission. Additionally, metadata related to the transmission and receipt may be captured at both the image workflow server 106 and the computing pad 202. For example, information about the status of the computing pad 202 may also be recorded and logged as part of the metadata such as time of day, date, GPS location, computing pad 202 information such as version of firmware and operating system, the IDs of any other devices within radio communication of the computing pad 202, and other information. The user inputs annotations using the stylus 204 and the annotations are captured and stored 608 on the computing pad 202. In one embodiment, the document with the new annotations (annotated document) is also backed up 610 to storage on the computing pad 202. In another embodiment, the annotated document is also backed up 612 to storage at a server. This server may be either the stroke and image workflow server 106 or a separate independent backup server. These backup steps may also include metadata of the type just described above. Those skilled in the art will understand that steps 610 and 612 are optional; and therefore, depicted with dashed lines in FIG. 6. The method continues by sending 614 the annotated document to the stroke and image workflow server 106. The stroke and image workflow server 106 then determines 616 a next step in the workflow for the annotated document. Those skilled in the art will recognize this could include forwarding the annotated document onto a single next device for processing or it could be transmitting the annotated document to plurality of other devices for further processing. Those skilled in the art will also recognize that transmission may be performed by first computing the differences between the annotated document and the version stored on the receiving server, and then transmitting just the differences. The method completes by sending 618 the annotated document to another device to perform the next step in the workflow. Those skilled in the art will recognize that the steps of FIG. 6 can be performed repeatedly or iteratively such that the workflow for particular document is traversed and the document can be sent to and from the stroke and image workflow server 106 any number of times to any number of different computing pads 202. Those skilled in the art will recognize that in one embodiment at each step of the transmission of the annotated unmodified document, a rolling hash is maintained by each computing device and also stores and the other metadata such as recipient's information (i.e., IP address), the transmitter's information, time of delivery, date of delivery, confirmation of delivery, confirmation receipt, etc.

The present embodiment of invention is particularly advantageous because of the level to which it automatically processes forms or documents and advances them in a workflow. FIGS. 5 and 6 described above illustrate how the present embodiment of invention is automatic in that forms or documents are automatically advanced in the workflow and sent from the stroke and image workflow server 106 to the portable computing devices 102a-n. Once the forms or documents have been annotated by the user, they are sent back to the stroke and image workflow server 106 with the user merely having to input a single "submit" command or instruction. This automatic level processing of forms or documents is particularly advantageous because it makes the portable computing devices 102a easy and simple enough to use for every day document processing. Moreover, the present embodiment of invention lends itself to providing the user with an experience or interaction that very closely mimics the use of pencil and paper, thereby requiring little or no learning curve.

The present embodiment of invention is also advantageous because it provides a series of user interfaces that are very simple and easy-to-use. In particular, the user interfaces that will be described below provide two modes of interaction with the computing pad 202. In a first mode (inbox mode), a user interface presents an inbox that lists all the documents that are modifiable, editable or annotable by the user. This in this first mode, the user is limited to three actions: 1) re-sort the order in which the documents are listed; 2) select a document for editing; 3) create a new document for editing. In a second mode (document annotation mode), a user interface is presented that displays an image of a document. Again, the user is limited to three actions: 1) add strokes or annotations to the document; 2) add a picture to the document; 3) transition to displaying a different page of the image or transitioning back to the inbox mode. The present embodiment of invention is particularly advantageous because it limits the number of decisions required by the user. By providing only two interfaces in which to interact with documents and constraining the number of actions that may be taken in each mode, the user interface is elegantly simple and efficient. This allows the user interfaces to be adopted easily with little or no learning curve, providing a user experience that mimics the interaction with paper, and integrating the collection of collection of information with automatic processing within a workflow. Furthermore, the present embodiment of invention provides a single command workflow routing.

Referring now to FIG. 7, the dual-mode operation of the present embodiment of invention and transitions between user interfaces of the present embodiment of invention will be described. FIG. 7 is a flow diagram that shows one embodiment for seven user interfaces 702, 706, 710, 714, 722, 732 and 734 that provide the dual-mode operation of an inbox mode and document editing mode. Those skilled in the art will recognize that the present embodiment of invention in its purest form could be limited to two user interfaces.

The computing pad 202 when it is powered off provides a blank screen 702. When the user turns on 704 the computing pad 202, a splash screen 706 is displayed while the computing pad 202 boots up and becomes operational. After the computing pad 202 has become operational, it displays 708a, 708b, 708c either a login screen 710, a last viewed form 722, or the inbox 714. In one embodiment, the user interface is automatically transitioned 708a from the splash screen 706 to the login screen 710. In another embodiment, the computing pad 202 determines whether the user was viewing a form when the computing pad 202 was turned off. If so, then the computing pad 202 transitions 708b from the splash screen 706 to a display that shows the last form that was viewed 722. In yet another embodiment, the computing pad 202 determines whether the user was viewing the inbox. If so, the computing pad 202 transitions 708c from the splash screen 706 to displaying the inbox 714.

When the login screen 710 is displayed, it includes fields for entry of a password and/or a user name and a selectable button. The user annotates the login screen 710 with strokes and selects the button to input a username and/or password to the computing pad 202. If the input by the user does not match the username and/or password stored in the computing pad 202, the login screen is updated to indicate that the username and/or password are not valid and asking the user to input the username and/or password again. In one embodiment, if the user name and/or password are valid, the user interface transitions 712a from the login screen 710 to the inbox view 714.

In another embodiment, if the username and/or password are valid, the user interface transitions 712b from the login screen 710 to the form view. As described above for the alternate transitions from the splash screen 706, the transitions to the either the inbox view 714 or the form view 722 from the login screen 710 may be determined based upon the mode in which the computing pad 202 was in prior to shutdown. In yet another embodiment, if the user does not import any commands to the computing pad 202 for predetermined amount of time or inputs that the computing pad 202 should enter sleep mode, the user interface transitions 718 from the login screen 710 to the sleep view 732.

When the inbox view 714 is displayed, it shows a first mode view or graphical user interface (GUI) of the present embodiment of invention. The appearance and functionality of the inbox view 714 is described in more detail below with reference to FIG. 8. The present embodiment of invention advantageously limits the number of actions that can be performed when the inbox view 714 is displayed so that the computing pad 202 is very easy to use. In one embodiment, these actions include: switching the computing pad 202 off, selecting a form for editing, switching the computing pad 202 to sleep mode, creating a new form, and reordering the messages in the inbox. If the user switches 716 the computing pad 202 off, the user interfaces transition from the inbox 714 being displayed to the blank screen 702. If the user selects 724 a form for editing the user interface transitions from the inbox view 714 to the form view 722 which will be described in more detail below. If the user switches 728 the computing pad 202 to sleep mode, the method transitions to the sleep view 732. Those skilled in the art will recognize that the computing pad 202 may also transitioned to sleep mode automatically after a predetermined amount of time has elapsed without the user adding any strokes or providing any input to the computing pad 202. Finally, the user can transition 736 from the inbox view 714 to the new form view 734 in response to a command or selection from the user.

When the sleep view 732 is displayed, the computing pad 202 is in sleep mode. In one embodiment, the computing pad 202 displays a manufacturer logo, and instructions on how to transition the computing pad 202 out of sleep mode back to one of the two normal usage modes. For example, the display may show a message such as "Slide the Power Switch to Wake Up." In one embodiment, selection of the power switch causes the computing pad 202 to wake up 720 and transitions the user interface from the sleep view 732 to the login screen 710. In another embodiment, the selection of the power switch causes the computing pad 202 to determine the state in which the computing pad 202 was in prior to entering sleep mode. If the computing pad 202 was displaying the inbox view 714 prior to entering sleep mode, the user interface transition 730 from the sleep view 732 to the inbox view 714. On the other hand, if the computing pad was displaying the form view 722 prior to entering the sleep mode, the user interface transitions 740. In an alternate embodiment, the computing pad 202 transitions from the sleep view 732 to a preset view (either the inbox view 714 or the form view 722) regardless of what state the computing pad 202 was in prior to entering sleep mode.

When the form view 722 is displayed, it shows a second mode view or graphical user interface (GUI) of the present embodiment of invention. The appearance and functionality of the form view 722 is described in more detail below with reference to FIG. 9. The second mode allows the user to annotate the document being displayed by entering or adding strokes to that document. After the user has completed annotating the document, the user can select 726 an icon on the form view 722 which causes the user interfaces to transition from the form view 722 to the inbox view 714. In one embodiment, upon entering form view, the computing pad 202 determines whether the user has previously viewed the current form. If so, the computing pad 202 transitions to a display that shows the last page viewed of the loaded form.

When the new form view 734 is displayed, the user is in the process of creating a new document. Typically, the user can only create a document from a plurality of pre-existing templates for documents. One embodiment for the form view 734 is shown on the computing pad 202 in FIG. 2. Once the user selects the new form to be created, the computing pad 202 creates the document and transitions back to the inbox view 714. Since the new form has now been created, the inbox view 714 is updated to list the newly created form as well as whatever forms existed prior to its creation. Those skilled in the art will recognize that this allows the user to dynamically create new forms with the computing pad 202 alone even when disconnected from the stroke and image server 106.

Figure 8:
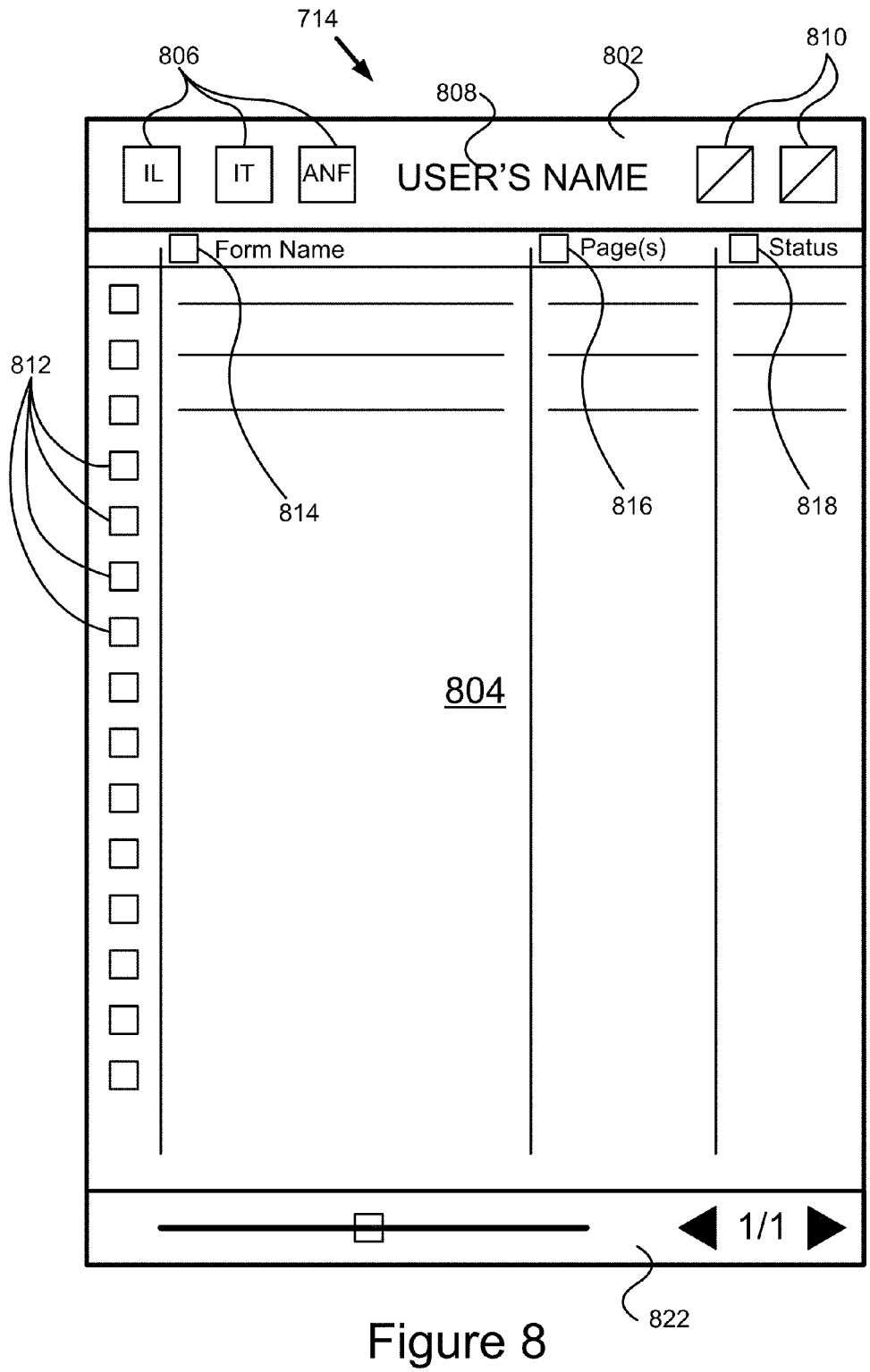
FIG. 8 is a graphic representation of one embodiment of the inbox user interface in accordance with the present embodiment of invention.

Referring now to FIG. 8, one embodiment for the inbox view or user interface 714 is shown. The inbox view 714 is a window including a menu area 802, a display area 804 and a navigation area 822.

The menu area 802 includes a plurality buttons 806, a label 808 for the computing pad 202, and status indicators 810 for the computing pad 202. The buttons 806 allow the user to modify how the documents are listed in the inbox or to create a new document. For example, one button 806 labeled "IL" (inbox list) presents the documents in the inbox as a list as shown in FIG. 8. Another button 806 labeled "IT" (inbox thumbnail) causes the display area 804 to show the documents as thumbnail images of the first page of each document. A third button 806 labeled "ANF" (Add New Form) toggles between the user interface of FIG. 2A that shows selectable templates of new documents that can be created along the bottom of the window of the display device 206 and the display shown in FIG. 8 in which there is not an area that allows the user to create new documents. The label 808 is some indication of the owner of the computing pad 202 such as the user's name. The status indicators 810 are icons used to show the status of the computing pad 202. For example, different icons such as a series of bars, a series of radio slats or a battery may be shown to indicate the status of the Wi-Fi signal, a 3G signal (or Bluetooth), or a battery respectively.

The display area 804 includes a plurality of selection buttons 812, a series of columns, and a series of buttons 814, 816, 818 and labels. The present embodiment of invention advantageously lists the documents each having a corresponding row with a series of columns similar to the presentation of e-mails in inbox. Each of the documents (row) has a corresponding selection button 812. When the user selects the selection button 812, the computing pad 202 transitions from the inbox view 714 of FIG. 8 to the form view 722 of FIG. 9 with the selected document being displayed. Each row has four columns, one for the selection button 812, one for a form name, one for the number of pages in the document, and finally one for the status of the document. An area proximate the top area of the display area 804 provides a series of column headers. In one embodiment, the three columns each have a selection button 814, 816, 818 and a corresponding label. For example, the second column includes the selection button 814 and the label "form name," the third column includes the selection button 816 and the label "Page(s)," and the fourth column includes the selection button 818 and the label "Status." In one embodiment, only one of the three selection buttons 814, 816, 818 is selectable at any given time. Based on the selection of the user the documents listed and shown in the display area 804 are sorted according to the attribute of the selection button 814, 816, 818. In other words, the documents are listed sorted either according to form name, number of pages or status. The status of a document is its status in the work flow or its status of review or editing. The status of any document in the inbox can be one of the following and they may be provided with an icon visually corresponding to their status: 1) submitted and uploaded; 2) submitted (but not uploaded); 3) edited; 4) read (but not edited); and 5) new (not opened).

The navigation area 822 includes controls to navigate between pages and an indicator as to what page of the document is being displayed. For example, the navigation area includes a slider bar with the square or rectangle indicating the page position within the document. The navigation area 822 also includes a pair of buttons to navigate to the next page or previous page with an indication of which page in the total number of pages between the two buttons.

Figure 9:
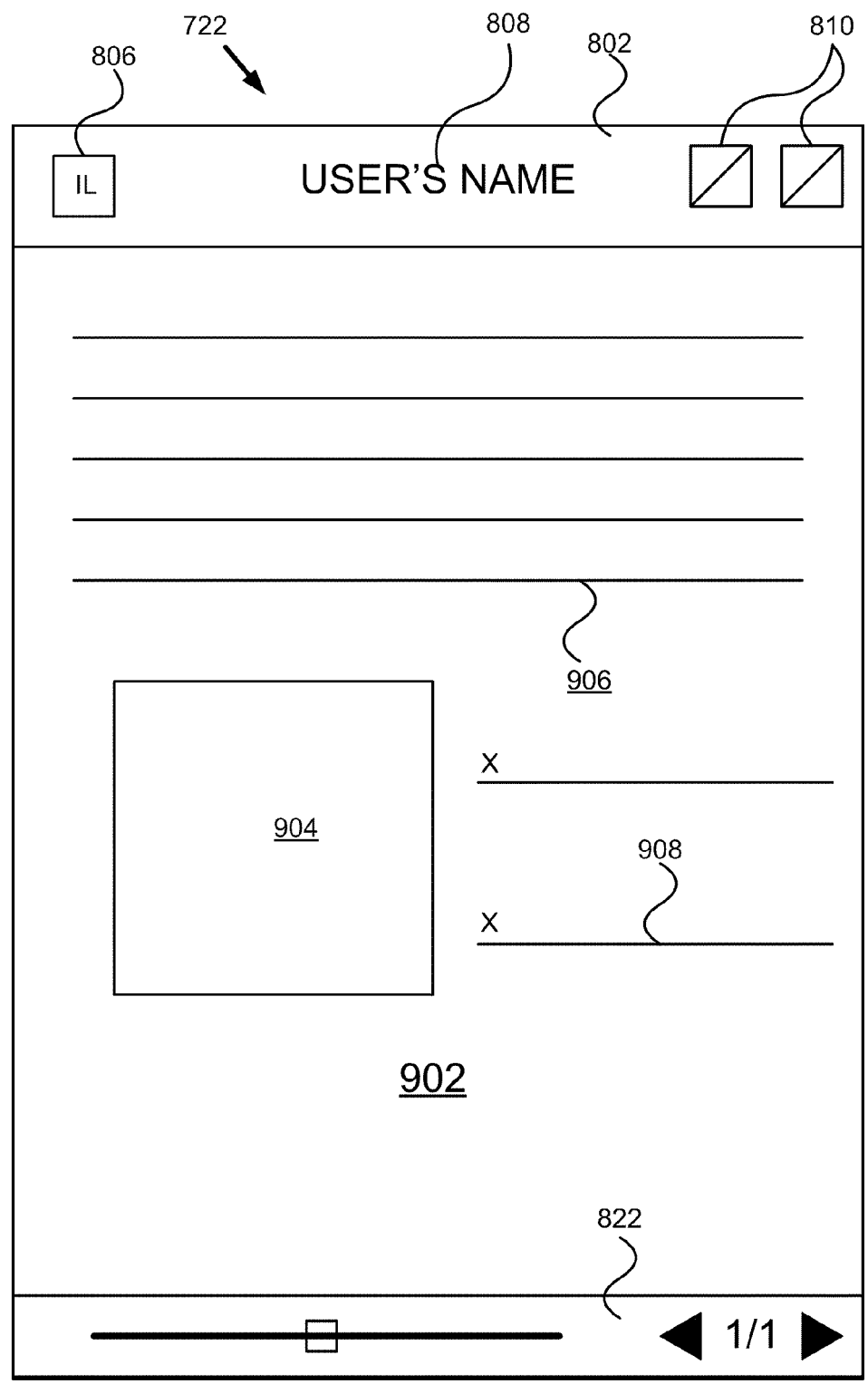
FIG. 9 is a graphic representation of an example form displayed in one embodiment of the form user interface in accordance with the present embodiment of invention.

Referring now to FIG. 9, one embodiment for the form view or user interface 722 is shown. The form view 722 is a window including a menu area 802, a display area 902 and a navigation area 822. The menu area 802 of the form view 722 is similar to that described above for the inbox view 714; however, the menu area 802 of the form view only includes a single button 806 that transitions from the form view 722 to the inbox view 714. The navigation area 822 of the form view 722 is similar to that described above for the inbox view 714 that description will not be repeated here.

The display area 902 of the form view 722 is used to display an image of a page of the document. FIG. 9 shows an example form with a plurality of areas such as an area for inserting an image 904, an area 906 for filling in responses to questions, and area for signatures 908. During display of the form view 722, the user can add annotations to any of the above areas 904, 906 and 908 simply by moving the stylus 204 over the display 206. Those skilled in the art will recognized that any number of different types of forms or documents may be displayed and that these forms may have various different pages including text-only, or text in combination with any of the areas 904, 906 and 908. This user interface is purely advantageous because it allows the user to process the document by annotating it in the form view 722 just as the user would with a piece of paper. Once the user has completed all her annotations to the document, she need only hit the submit button 214, and the computing pad 202 automatically records these annotations, stores the document of the computing pad 202, forward the document to the stroke and image workflow server 106, and the stroke and image workflow server 106 completes additional processing on the annotated document as necessary. For example, in one embodiment when the form view 722 is being displayed and the user selects or presses the submit button 214, the computing pad 202 determines the document that is currently being displayed in the form view 722, creates an annotated document by adding any strokes or other input that have been received by the computing pad 202 for this document (they may or may not have been stored at the computing pad 202), then sends the annotated document to the stroke and image workflow server 106. In an alternate embodiment, the computing pad 202 determines not only the document but also the page that is currently being displayed in the form view 722, and only submits the page of the document to the stroke and image workflow server 106. In yet another embodiment, the computing pad 202 determines whether it has received any stroke input or other input that can be added to the document to create and annotated document. If the computing pad has received some stroke input or other input, the process continues as described above by creating an annotated document and sending it from the computing pad 202 to the stroke and image server 106. On the other hand, if the computing pad 202 has not received stroke input or other input the computing pad 202 displays an error message to the user indicating that no editing has been done on the document being displayed in the form view 722; and therefore, no document or annotated document will be sent to the stroke and image workflow server 106. In yet another embodiment, the computing pad 202 ensures that any document presented in the form view 722 has been completed to the level desired by the recipient. For example, a document may require that a particular number of fields out of all fields in the document be completed before the document may be submitted. In such a case, the computing pad 202 determines whether the number, length, and other features of the input data are sufficient enough to meet the requirements of the document being presented in the form view 722. If so, the computing pad 202 creates an annotated document from the requisite input and sends the annotated document to the stroke and image workflow server. If not, the computing pad 202 displays one or more error messages indicating that required fields of the document have not be completed and therefore the document cannot be (and will not be) submitted. The error messages may range from just a general error message to more particular error messages that identifies to the user what field of the former page must be completed before it can be submitted. Those skilled in the art will recognize from the description of above that there are a variety of modifications to the different enforcement scenarios that may be applied by the computing pad 202 before submission of the document is executed by the computing pad 202.

Referring now back to FIG. 2A, an embodiment of the new form view 734 is shown. The new form view 734 is similar to the inbox view 714 described above. However, the new form view 734 also includes a bottom region 750 including a label, a navigation area and a new form template area. Within the new form template area are forms that are selectable by the user. In response to selection of one of the forms in the template area, the computing pad 202 creates a new form of that type that was selected and adds it to the list maintained by the inbox. FIG. 2A shows the inbox with no documents and prior to user selection of a form from the template area. In an alternate embodiment, each thumbnail image of a form template may include a checkbox proximate the upper left corner of the thumbnail. In response to user selection of the checkbox the computing pad 202 performs the steps of creating and adding a new document to the inbox.

One example or use case of the present embodiment of invention is for a driver/delivery person to confirm delivery of goods have been completed. At the beginning of the day before deliveries have begun, the computing pad 202 is loaded with a series of documents, each document corresponding to a delivery that needs to be made that day. Each of the documents can be displayed in the inbox view 714 for the driver to confirm what deliveries need to be made that day. As the driver makes a delivery, he can select the document corresponding to the delivery in the inbox view 714. This causes computing pad 202 to display an order confirmation form corresponding to delivery. The driver presents the computing pad 202 to the person accepting delivery to sign the computing pad 202, and strokes corresponding to their signature are added to the document. The person accepting delivery or the driver selects the submit button 214, and the document is automatically processed and routed back to the stroke and image workflow server 106. Assuming the driver and the computing pad 202 have network access or an ability to connect with the stroke and image workflow server 106, then the document is submitted immediately. However even if the computing pad 202 does not have access to the stroke and image workflow server 106 while en route, when the delivery person returns to the office, the documents can be sent to the stroke and image workflow server 106 at that time. Thus, the invention advantageously integrates electronic document workflow into a traditional area in which paper would be required. In this case, a simple two mode user interface provided by the present embodiment of invention along with the computing pad 202 effectively replace the use of pen and paper, provide electronic documents and signatures, and provide automatic and faster routing of information.

The foregoing description of the embodiments of the present embodiment of invention has been presented for the purposes of illustration and description. It is not intended to be exhaustive or to limit the present embodiment of invention to the precise form disclosed. Many modifications and variations are possible in light of the above teaching. It is intended that the scope of the present embodiment of invention be limited not by this detailed description, but rather by the claims of this application. As will be understood by those familiar with the art, the present embodiment of invention may be embodied in other specific forms without departing from the spirit or essential characteristics thereof. Likewise, the particular naming and division of the modules, routines, features, attributes, methodologies and other aspects are not mandatory or significant, and the mechanisms that implement the present embodiment of invention or its features may have different names, divisions and/or formats. Furthermore, as will be apparent to one of ordinary skill in the relevant art, the modules, routines, features, attributes, methodologies and other aspects of the present embodiment of invention can be implemented as software, hardware, firmware or any combination of the three. Also, wherever a component, an example of which is a module, of the present embodiment of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of invention is in no way limited to implementation in any specific programming language, or for any specific operating system or environment. Accordingly, the disclosure of the present embodiment of invention is intended to be illustrative, but not limiting, of the scope of the present embodiment of invention, which is set forth in the following claims.

The invention claimed is:

1. A method for processing a document workflow, the method comprising:
    receiving a document at a portable computing device, the document including at least a first page and a second page;
    displaying a list of documents in an inbox view of a two-mode user interface, wherein the inbox view includes a status of the document indicating a current step of the document in the document workflow;
    receiving a selection of the document from the list of documents;
    transitioning from the inbox view of the two-mode user interface to a form view of the two-mode user interface;
    displaying the document in the form view of the two-mode user interface;
    capturing input strokes and adding the input strokes to the document to create an annotated document;
    receiving a submit command;

computing differences between the first page of the annotated document and the first page of the document received at the portable computing device and differences between the second page of the annotated document and the second page of the document received at the portable computing device, wherein the differences include changes made to the document received at the portable computing device due to the addition of the input strokes; and automatically sending the differences to a server in response to receiving the submit command, the annotated document including page metadata associated with each of the first and second pages, wherein the server determines a first location and a first workflow step for the first page of the annotated document by retrieving the first location and the first workflow step from the page metadata associated with the first page and determines a second location and a second workflow step for the second page of the annotated document by retrieving the second location and the second workflow step from the page metadata associated with the second page.

2. The method of claim 1, wherein the form view of the two-mode user interface shows the first page of the document.

3. The method of claim 1, wherein the inbox view of the two-mode user interface includes a graphic user interface of the list of documents, each document represented by a row in the inbox and having a selection button, a form name, a number of pages and the status.

4. The method of claim 3, wherein the list of documents is sortable by the form name, the number of pages or the status.

5. The method of claim 2, wherein the form view of the two-mode user interface is configured to accept the input strokes and includes navigation controls and a button to transition to displaying the inbox view of the two-mode user interface.

6. The method of claim 1, wherein the server maintains a system log that also includes the page metadata and document metadata for the annotated document.

7. The method of claim 1 further comprising backing up the annotated document.

8. The method of claim 1 further comprising:
receiving an input to add a new document;
displaying a new form user interface;
receiving a template selection;
creating the new document with formatting and content matching the template selection; and
adding the new document to the list of documents.

9. A computer program product comprising a non-transitory computer usable medium including a computer readable program, wherein the computer readable program when executed on a computer causes the computer to:
receive a document at a portable computing device, the document including at least a first page and a second page;
display a list of documents in an inbox view of a two-mode user interface, wherein the inbox view includes a status of the document indicating a current step of the document in the document workflow;
receive a selection of the document from the list of documents;
transition from the inbox view of the two-mode user interface to a form view of the two-mode user interface;
display the document in the form view of the two-mode user interface;
capture input strokes and add the input strokes to the document to create an annotated document;
receive a submit command;

compute differences between the first page of the annotated document and the first page of the document received at the portable computing device and differences between the second page of the annotated document and the second page of the document received at the portable computing device, wherein the differences include changes made to the document received at the portable computing device due to the addition of the input strokes; and automatically send the differences to a server in response to receiving the submit command, the annotated document including page metadata associated with each of the first and second pages, wherein the server determines a first location and a first workflow step for the first page of the annotated document by retrieving the first location and the first workflow step from the page metadata associated with the first page and determines a second location and a second workflow step for the second page of the annotated document by retrieving the second location and the second workflow step from the page metadata associated with the second page.

10. The computer program product of claim 9, wherein the form view of the two-mode user interface shows the first page of the document.

11. The computer program product of claim 9, wherein the inbox view of the two-mode user interface includes a graphic user interface of the list of documents, each document represented by a row in the inbox and having a selection button, a form name, a number of pages and the status.

12. The computer program product of claim 11, wherein the list of documents is sortable by the form name, the number of pages or the status.

13. The computer program product of claim 10, wherein the form view of the two-mode user interface is configured to accept the input strokes and includes navigation controls and a button to transition to displaying the inbox view of the two-mode user interface.

14. The computer program product of claim 9, wherein the server maintains a system log that also includes the page metadata and document metadata for the annotated document.

15. The computer program product of claim 9, wherein the computer readable program when executed on the computer causes the computer to also back up the annotated document.

16. The computer program product of claim 9, wherein the computer readable program when executed on the computer causes the computer to also:
receive an input to add a new document;
display a new form user interface;
receive a template selection;
create the new document with formatting and content matching the template selection; and
add the new document to the list of documents.

17. An apparatus for processing a document workflow, the apparatus comprising:
one or more processors;
a document transfer module stored in a memory and executable by the one or more processors, the document transfer module for receiving a document, the document including at least a first page and a second page, receiving a submit command, computing differences between the first page of the annotated document and the first page of the document received at the portable computing device and differences between the second page of the annotated document and the second page of the document received at the portable computing device, wherein the differences include changes made to the document received at the portable computing device due to the addition of the input strokes, and automatically sending the differences to a server in response to receiving the submit command, the annotated document including page metadata associated with each of the first and second pages, wherein the server determines a first location and a first workflow step for the first page of the annotated document by retrieving the first location and the first workflow step from the page metadata associated with the first page and determines a second location and a second workflow step for the second page of the annotated document by retrieving the second location and the second workflow step from the page metadata associated with the second page;

a presentation module stored in a memory and executable by the one or more processors, the presentation module coupled to the document transfer module for displaying a list of documents in an inbox view of a two-mode user interface, wherein the inbox view includes a status of the document indicating a current step of the document in the document workflow, transitioning from the inbox view of the two-mode user interface to a form view of the two-mode user interface in response to a selection of the document from the list of documents, displaying the received document in a two-mode user interface; and a stroke capture module stored in the memory and executable by the one or more processors, the stroke capture module coupled to the document transfer module for capturing input strokes and adding the input strokes to the received document to create the annotated document.

18. The apparatus of claim 17, further comprising a logging module for creating and storing a log of the page metadata and document metadata, the logging module coupled to the one or more processors.

19. The apparatus of claim 17, wherein the form view of the two-mode user interface shows the first page of the received document.

20. The apparatus of claim 17, wherein the inbox view of the two-mode user interface includes a graphic user interface of the list of documents, each document represented by a row in the inbox and having a selection button, a form name, a number of pages and the status.

* * * * *